United States Patent
Suzuki et al.

(10) Patent No.: US 9,896,548 B2
(45) Date of Patent: Feb. 20, 2018

(54) METHOD OF PRODUCING POLYARYLENE SULFIDE

(71) Applicant: Kureha Corporation, Tokyo (JP)

(72) Inventors: Kenji Suzuki, Tokyo (JP); Ken-Ichi Takaki, Tokyo (JP); Yasuhiro Suzuki, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 15/300,404

(22) PCT Filed: Mar. 27, 2015

(86) PCT No.: PCT/JP2015/059570
§ 371 (c)(1),
(2) Date: Sep. 29, 2016

(87) PCT Pub. No.: WO2015/152032
PCT Pub. Date: Oct. 8, 2015

(65) Prior Publication Data
US 2017/0137573 A1 May 18, 2017

(30) Foreign Application Priority Data

Mar. 31, 2014 (JP) ................. 2014-071839

(51) Int. Cl.
C08G 75/14 (2006.01)
C08G 75/0259 (2016.01)
C08G 75/0254 (2016.01)
C08G 75/0213 (2016.01)

(52) U.S. Cl.
CPC ..... C08G 75/0259 (2013.01); C08G 75/0213 (2013.01); C08G 75/0254 (2013.01)

(58) Field of Classification Search
CPC  C08G 75/14; C08G 75/0263; C08G 75/0268; C08G 75/0259; C08G 75/025; B30B 9/28
See application file for complete search history.

(56) References Cited

U.S. PATENT DOCUMENTS

| 4,786,711 A | 11/1988 | Senatore et al. |
| 2006/0074219 A1 | 4/2006 | Kawama et al. |
| 2007/0265425 A1 | 11/2007 | Suzuki et al. |
| 2012/0329983 A1* | 12/2012 | Kim ....... C08G 75/02 528/389 |
| 2013/0253147 A1 | 9/2013 | Ichinose et al. |

FOREIGN PATENT DOCUMENTS

| CN | 1742037 A | 3/2006 |
| CN | 101048443 A | 10/2007 |
| CN | 103228705 A | 7/2013 |
| JP | H02302436 A | 12/1990 |
| JP | H0651792 B2 | 7/1994 |
| JP | 2004244619 A | 9/2004 |
| WO | 2006046748 A1 | 5/2006 |
| WO | 2012070335 A1 | 5/2012 |

OTHER PUBLICATIONS

First Office Action for PCT/JP2015/059570/CN201580016395.7 dated Feb. 4, 2017, by the State Intellectual Property Office of China.
Search Report for PCT/JP2015/059570/CN201580016395.7 dated Jan. 24, 2017, by the State Intellectual Property Office of China.
International Search Report of PCT/JP2015/059570 dated Apr. 21, 2015.

* cited by examiner

*Primary Examiner* — Shane Fang
(74) *Attorney, Agent, or Firm* — Birch, Stewart, Kolasch & Birch, LLP

(57) ABSTRACT

Provided is a method of producing polyarylene sulfide (PAS) that suppresses side reactions and produces PAS with a high purity and a high molecular weight at a high yield. A method of producing PAS in which a sulfur source and a dihalo aromatic compound are polymerized in an organic amide solvent, the method of producing PAS comprising the following steps 1 to 3: step 1: a preparation step of preparing a mixture containing an organic amide solvent, a sulfur source, water, a dihalo aromatic compound, and an alkali metal hydroxide in an amount that is less than an equimolar amount relative to the sulfur source; step 2: a first-stage polymerization step of initiating a polymerization reaction by heating the mixture, and producing a prepolymer having a dihalo aromatic compound conversion rate of 50% or greater; and step 3: a second-stage polymerization step of adding from 0.11 to 0.3 mol of an alkali metal hydroxide per 1 mol of the sulfur source, and continuing the polymerization reaction. A PAS polymerization reaction solution having a low content of byproduct. PAS having an average particle diameter of 10 to 5,000 μm, a melt viscosity (temperature 310° C., shear rate 1,216 $sec^{-1}$) of 0.1 to 3,000 Pa·s, and a nitrogen content of 750 ppm or less.

14 Claims, No Drawings

METHOD OF PRODUCING POLYARYLENE SULFIDE

TECHNICAL FIELD

The present invention relates to a method of producing polyarylene sulfide in which a sulfur source and a dihalo aromatic compound are subjected to a polymerization reaction in an organic amide solvent. The present invention particularly relates to a method of producing polyarylene sulfide in which a sulfur source and a dihalo aromatic compound are subjected to a polymerization reaction in an organic amide solvent in the presence of an alkali metal hydroxide.

BACKGROUND ART

Polyarylene sulfide (hereinafter, also referred to as "PAS"), represented by polyphenylene sulfide (hereinafter, also referred to as "PPS"), is an engineering plastic having excellent heat resistance, chemical resistance, flame retardancy, mechanical strength, electrical characteristics, dimensional stability, and the like. PAS has been widely used in a wide variety of fields, such as electric/electronic devices and devices for automobiles, since PAS can be formed into various molded products, films, sheets, fibers, and the like by ordinary melt processing methods, such as extrusion molding, injection molding, and compression molding.

As a representative method of producing PAS, a method in which a sulfur source and a dihalo aromatic compound, such as p-dichlorobenzene (hereinafter, also referred to as "pDCB"), are subjected to a polymerization reaction in an organic amide solvent, such as N-methyl-2-pyrrolidone (hereinafter, also referred to as "NMP") has been known. Furthermore, a method of producing PAS in which a sulfur source and a dihalo aromatic compound are subjected to a polymerization reaction in an organic amide solvent in the presence of an alkali metal hydroxide has been known (Patent Documents 1 and 2 and the like). Although an alkali metal sulfide is mainly used as the sulfur source, a method in which an alkali metal sulfide formed by reacting an alkali metal hydrosulfide and an alkali metal hydroxide in situ is used as a sulfur source is also known.

For a method of producing PAS in which a sulfur source and a dihalo aromatic compound are subjected to a polymerization reaction in an organic amide solvent in the presence of an alkali metal hydroxide, an attempt has been made to set conditions to stably perform the polymerization reaction and to suppress side reactions. That is, in this polymerization method, since an alkali metal hydroxide, such as sodium hydroxide (NaOH), is used at a high concentration during the polymerization reaction, the organic amide solvent is readily decomposed by the alkali metal hydroxide and the decomposition product may be the cause of side reactions.

For example, when NMP and NaOH are reacted, the ring of the NMP is opened to form sodium methyl amino butanoate (($CH_3$)NH—$CH_2$—$CH_2$—$CH_2$—COONa; hereinafter, also referred to as "SMAB"). This compound reacts with p-dichlorobenzene, which is a monomer, to form chlorophenyl methyl amino butanoic acid (hereinafter, also referred to as "CPMABA").

CPMABA and/or SMAB participates in the polymerization reaction, and forms a methyl amino butanoic acid group at a terminal of the produced PAS, thereby acting as a polymerization terminator of the PAS, and thus it is difficult to obtain highly polymerized PAS. Furthermore, since CPMABA is a byproduct formed by reacting SMAB with p-dichlorobenzene, which is a monomer forming PAS, the formation of CPMABA results in loss of raw materials that form PAS and reduction in yield of PAS.

Furthermore, in cases where the obtained PAS contains a compound having a nitrogen atom as an impurity, when the obtained PAS is injection-molded or extrusion-molded, a problem occurs in that the impurity adheres to the mold or die. Since such contamination of the mold, die, or the like due to a compound containing a nitrogen atom negatively affects the quality of molded product, frequent cleaning is required.

Patent Document 3 discloses a method of producing PAS, in which a sulfur source containing an alkali metal hydrosulfide and a dihalo aromatic compound is subjected to a polymerization reaction in an organic amide solvent and, from the initiation to the completion of the polymerization reaction, pH of the polymerization reaction mixture is controlled to be in a range of 7 to 12.5 by adding an alkali metal hydroxide continuously or in portions to the polymerization reaction mixture. According to this method, PAS with a high purity and high melt viscosity can be stably obtained by suppressing side reactions and decomposition reactions. However, since the pH of the polymerization reaction mixture needs to be controlled so that the pH is in a range of 7 to 12.5 from the initiation to the completion of the polymerization reaction, apparatus for continuous addition and special controlling system under high temperature and high pressure are required.

Furthermore, Patent Document 4 discloses a method of producing PAS, including: a preparation step of preparing a preparation mixture containing an organic amide solvent, a sulfur source, an alkali metal hydroxide, water, and a dihalo aromatic compound, and having a pH of 12.5 or higher; a first-stage polymerization step of heating the preparation mixture to a temperature of 170 to 270° C. to initiate a polymerization reaction, thereby forming a prepolymer having a dihalo aromatic compound conversion rate of 50% or greater; and a second-stage polymerization step of adding a phase separation agent into the reaction system containing the prepolymer and adding an alkali metal hydroxide in an amount corresponding to 1 to 10 mol % per 1 mol of the sulfur source (charged sulfur source) at a time or in portions, thereby continuing the polymerization reaction at a temperature of 240 to 290° C. This method is a method of producing PAS that stably and efficiently produces PAS having excellent reactivity with a silane coupling agent and is not yet satisfactory from the perspectives of polymer yield and byproduct formation.

Therefore, as a method of producing PAS in which a sulfur source and a dihalo aromatic compound are polymerized in an organic amide solvent, a method of producing PAS that can suppress side reactions and produce PAS with a high purity and a high molecular weight at a high yield has been desired.

CITATION LIST

Patent Literature

Patent Document 1: Japanese Unexamined Patent Application Publication No. H02-302436A Patent Document 2: Japanese Examined Patent Application Publication No. H06-051792A Patent Document 3: Japanese Unexamined Patent Application Publication No. 2004244619A Patent Document 4: WO/2006/046748

SUMMARY OF INVENTION

Technical Problem

An object of the present invention is to provide a method of producing polyarylene sulfide that suppresses side reactions and produces polyarylene sulfide with a high purity and a high molecular weight at a high yield.

Solution to Problem

As a result of diligent research to achieve the object described above, the inventors of the present invention have found that the object can be achieved by adjusting the content of the alkali metal hydroxide contained in the polymerization reaction system during process in the method of producing polyarylene sulfide in which a sulfur source and a dihalo aromatic compound are polymerized in an organic amide solvent, and thus completed the present invention.

That is, according to the present invention, a method of producing polyarylene sulfide in which a sulfur source and a dihalo aromatic compound are polymerized in an organic amide solvent is provided, the method including the following steps 1 to 3:

step 1: a preparation step of preparing a mixture containing an organic amide solvent, a sulfur source, water, a dihalo aromatic compound, and an alkali metal hydroxide in an amount that is less than an equimolar amount relative to the sulfur source;

step 2: a first-stage polymerization step of initiating a polymerization reaction by heating the mixture, and producing a prepolymer having a dihalo aromatic compound conversion rate of 50% or greater; and step 3: a second-stage polymerization step of adding from 0.11 to 0.3 mol of an alkali metal hydroxide per 1 mol of the sulfur source, and continuing the polymerization reaction.

Furthermore, as specific aspects according to the present invention, the method of producing polyarylene sulfide described in (1) to (14) below is provided.

(1) The method of producing polyarylene sulfide described above, where the sulfur source contains one or both of an alkali metal sulfide and an alkali metal hydrosulfide.

(2) The method of producing polyarylene sulfide described above, where a dehydration step of discharging at least a part of distillate containing water from a system, containing a mixture containing an organic amide solvent, a sulfur source, and an alkali metal hydroxide, to outside the system by heating the mixture is performed before the preparation step.

(3) The method of producing polyarylene sulfide described above, where, in the preparation step, the mixture containing from 0.75 to 0.98 mol of the alkali metal hydroxide per 1 mol of the sulfur source is prepared.

(4) The method of producing polyarylene sulfide described above, where, in the preparation step, the mixture having a pH of greater than 12.5 but 14 or less is prepared.

(5) The method of producing polyarylene sulfide described above, where, in the preparation step, the mixture containing from 0.1 to 5.5 mol of the water per 1 kg of the organic amide solvent is prepared.

(6) The method of producing polyarylene sulfide described above, where, in the preparation step, the mixture containing from 0.95 to 1.2 mol of the dihalo aromatic compound per 1 mol of the sulfur source is prepared.

(7) The method of producing polyarylene sulfide described above, where, in the first-stage polymerization step, the mixture prepared in the preparation step is heated to a temperature of 170 to 270° C. to be subjected to the polymerization reaction.

(8) The method of producing polyarylene sulfide described above, where, in the first-stage polymerization step, the prepolymer having the dihalo aromatic compound conversion rate of 50 to 98% is produced.

(9) The method of producing polyarylene sulfide described above, where, in the second-stage polymerization step, the polymerization reaction is continued by heating to a temperature of 245 to 290° C.

(10) The method of producing polyarylene sulfide described above, where, in the second-stage polymerization step, the alkali metal hydroxide is added in a manner that a total amount of the alkali metal hydroxide is from 1.01 to 1.1 mol per 1 mol of the sulfur source.

(11) The method of producing polyarylene sulfide described above, where, in the second-stage polymerization step, the polymerization reaction is continued in a condition where a concentrated polymer phase and a dilute polymer phase are phase-separated in a reaction system.

(12) The method of producing polyarylene sulfide described above, where, in the second-stage polymerization step, water as a phase separation agent is added in a manner that a water content in the reaction system is greater than 4 mol but 20 mol or less per 1 kg of the organic amide solvent

(13) The method of producing polyarylene sulfide described above, where the method is performed in the presence of a phase separation agent.

(14) The method of producing polyarylene sulfide described above, where the phase separation agent is at least one type selected from the group consisting of organic carboxylic acid metal salts, organic sulfonic acid metal salts, alkali metal halides, alkaline earth metal halides, alkaline earth metal salts of aromatic carboxylic acids, phosphoric acid alkali metal salts, alcohols, paraffin hydrocarbons, and water.

Furthermore, according to the present invention, a polyarylene sulfide polymerization reaction solution after a polymerization reaction, the polyarylene sulfide polymerization reaction solution being obtained in a method of producing polyarylene sulfide in which a sulfur source and a dihalo aromatic compound are polymerized in an organic amide solvent, and having a content of chlorophenyl methyl amino butanoic acid of 16.5 mmol or less per 1 mol of the sulfur source, and preferably having a content of phenol of 9 mmol or less per 1 mol of the sulfur source, is provided. Furthermore, according to the present invention, a polyarylene sulfide obtained by the method of producing polyarylene sulfide described above, the polyarylene sulfide having an average particle diameter of 10 to 5,000 μm, a melt viscosity of 0.1 to 3,000 Pa·s measured at a temperature of 310° C. and a shear rate of 1,216 $sec^{-1}$, and a nitrogen content of 750 ppm or less, is provided.

Advantageous Effects of Invention

According to the present invention, by the method of producing polyarylene sulfide in which a sulfur source and a dihalo aromatic compound are polymerized in an organic amide solvent, the method including the following steps 1 to 3:

step 1: a preparation step of preparing a mixture containing an organic amide solvent, a sulfur source, water, a dihalo aromatic compound, and an alkali metal hydroxide in an amount that is less than an equimolar amount relative to the sulfur source;

step 2: a first-stage polymerization step of initiating a polymerization reaction by heating the mixture, and producing a prepolymer having a dihalo aromatic compound conversion rate of 50% or greater; and step 3: a second-stage polymerization step of adding from 0.11 to 0.3 mol of an alkali metal hydroxide per 1 mol of the sulfur source, and continuing the polymerization reaction; it is possible to provide the method of producing polyarylene sulfide that suppresses side reactions and produces polyarylene sulfide with a high purity and a high molecular weight at a high yield.

Furthermore, according to the present invention, by the polyarylene sulfide polymerization reaction solution after a polymerization reaction, the polyarylene sulfide polymerization reaction solution being obtained in a method of producing polyarylene sulfide in which a sulfur source and a dihalo aromatic compound are polymerized in an organic amide solvent, and having a content of chlorophenyl methyl amino butanoic acid of 16.5 mmol or less per 1 mol of the sulfur source, and preferably having a content of phenol of 9 mmol or less per 1 mol of the sulfur source, it is possible to suppress side reactions and to provide the polyarylene sulfide with a high purity and a high molecular weight, specifically the polyarylene sulfide having an average particle diameter of 10 to 5,000 μm, a melt viscosity of 0.1 to 3,000 Pa·s measured at a temperature of 310° C. and a shear rate of 1,216 $sec^{-1}$, and a nitrogen content of 750 ppm or less.

DESCRIPTION OF EMBODIMENTS

I. Method of Producing Polyarylene Sulfide

The method of producing polyarylene sulfide (hereinafter, also referred to as "PAS") of the present invention is a method in which a sulfur source and a dihalo aromatic compound are polymerized in an organic amide solvent and which includes the following steps 1 to 3:

step 1: a preparation step of preparing a mixture containing an organic amide solvent, a sulfur source, water, a dihalo aromatic compound, and an alkali metal hydroxide in an amount that is less than an equimolar amount relative to the sulfur source;

step 2: a first-stage polymerization step of initiating a polymerization reaction by heating the mixture, and producing a prepolymer having a dihalo aromatic compound conversion rate of 50% or greater; and step 3: a second-stage polymerization step of adding from 0.11 to 0.3 mol of an alkali metal hydroxide per 1 mol of the sulfur source, and continuing the polymerization reaction.

1. Sulfur Source

As the sulfur source in the present invention, an alkali metal sulfide, alkali metal hydrosulfide, or a mixture of these, i.e. one or both of an alkali metal sulfide and an alkali metal hydrosulfide, is preferably used. As the sulfur source, hydrogen sulfide can be also used. That is, in the case where an excessive amount of alkali metal hydroxide (e.g. NaOH) is present in a can after the dehydration step, an alkali metal sulfide (e.g. $Na_2S$) can be produced by blowing hydrogen sulfide in the can. As the sulfur source, an alkali metal hydrosulfide or a sulfur source containing the alkali metal hydrosulfide as a main component is preferable.

Examples of the alkali metal hydrosulfide include lithium hydrosulfide, sodium hydrosulfide, potassium hydrosulfide, rubidium hydrosulfide, cesium hydrosulfide, and mixtures of two or more types of these; however, the alkali metal hydrosulfide is not limited to these. Any of anhydride, hydrate, or aqueous solution of the alkali metal hydrosulfide may be used. Among these, sodium hydrosulfide and lithium hydrosulfide are preferable from the perspective of being readily available industrially at a low price. Furthermore, the alkali metal hydrosulfide is preferably used as an aqueous mixture (i.e. a mixture with water having fluidity), such as aqueous solution, from the perspectives of treating operation, weighing, and the like.

Typically, a little amount of alkali metal sulfide is produced as a byproduct in a production process of an alkali metal hydrosulfide. A little amount of alkali metal sulfide may be contained in the alkali metal hydrosulfide used in the present invention. Furthermore, the alkali metal hydrosulfide tends to be stable when a little amount of alkali metal sulfide is contained. Furthermore, from the perspective of ease in controlling pH of the polymerization reaction mixture, the content of the alkali metal sulfide is preferably not too large.

Therefore, when a mixture of an alkali metal hydrosulfide and an alkali metal sulfide is used as the sulfur source, the alkali metal hydrosulfide is preferably the main component, and a mixture of greater than 50 mol % of the alkali metal hydrosulfide and less than 50 mol % of the alkali metal sulfide is more preferable.

Furthermore, in the case where the sulfur source is a mixture of an alkali metal hydrosulfide and an alkali metal sulfide, from the perspective of ease in controlling the pH of the polymerization reaction system, the composition thereof is preferably from 70 to 99.5 mol % of alkali metal hydrosulfide and from 0.5 to 30 mol % of alkali metal sulfide, more preferably from 90 to 99.5 mol % of alkali metal hydrosulfide and from 0.5 to 10 mol % of alkali metal sulfide, even more preferably from 95 to 99.5 mol % of alkali metal hydrosulfide and from 0.5 to 5 mol % of alkali metal sulfide, and particularly preferably from 97 to 99.5 mol % of alkali metal hydrosulfide and from 0.5 to 3 mol % of alkali metal sulfide.

In the case described above, the total amount of moles of the alkali metal hydrosulfide and the alkali metal sulfide is an amount of moles of the sulfur source that directly relates to the production of PAS (hereinafter, also referred to as "charged sulfur source" or "effective sulfur source"). Furthermore, in the case where the dehydration step is performed before the preparation step, this total amount of moles is an amount of moles of the charged sulfur source after the dehydration step.

Examples of the alkali metal sulfide include lithium sulfide, sodium sulfide, potassium sulfide, rubidium sulfide, cesium sulfide, and mixtures of two or more types of these; however, the alkali metal sulfide is not limited to these. Any of anhydride, hydrate, or aqueous solution of the alkali metal sulfide may be used. Among these, sodium sulfide is preferable from the perspective of being readily available industrially at a low price and being easily handled. As these alkali metal sulfides, alkali metal sulfides that are ordinarily commercially available in the form of hydrates can be used in addition to those contained as byproducts in the alkali metal hydrosulfide. Examples of the hydrate of alkali metal sulfide include sodium sulfide nonahydrate ($Na_2S.9H_2O$), sodium sulfide pentahydrate ($Na_2S.5H_2O$), and the like. The alkali metal sulfide is preferably used as an aqueous mixture (i.e. a mixture with water having fluidity), such as aqueous solution, from the perspective of treating operation, weighing, and the like.

2. Alkali Metal Hydroxide

Examples of the alkali metal hydroxide include lithium hydroxide, sodium hydroxide, potassium hydroxide, rubidium hydroxide, cesium hydroxide, and mixtures of two or more types of these; however, the alkali metal hydroxide is not limited to these. Among these, sodium hydroxide is preferable from the perspective of being readily available industrially at a low price. The alkali metal hydroxide is preferably used as an aqueous mixture (i.e. a mixture with water having fluidity), such as aqueous solution, from the perspective of handling during weighing, and the like. As described below, the present invention prepares a mixture containing an alkali metal hydroxide in an amount that is less than an equimolar amount relative to the sulfur source in the preparation step, i.e. the charged amount of the alkali metal hydroxide is less than 1 mol per 1 mol of the sulfur source (alkali metal sulfide and/or alkali metal hydrosulfide) remained in the system after the dehydration step described below.

3. Dihalo Aromatic Compound

The dihalo aromatic compound used in the present invention is a dihalogenated aromatic compound having two halogen atoms directly bonded to an aromatic ring. Specific examples of the dihalo aromatic compound include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, dihalodiphenyl ketone, and the like.

Note that "halogen atom" indicates each atom of fluorine, chlorine, bromine, or iodine, and the two halogen atoms in the dihalo aromatic compound may be the same or different. The dihalo aromatic compound may be used alone or in a combination of two or more types thereof. The preferred dihalo aromatic compound is p-dichlorobenzene (pDCB) which is p-dihalobenzene having a chlorine atom as the halogen atom.

The charged amount of the dihalo aromatic compound is typically from 0.9 to 1.5 mol, preferably from 0.95 to 1.2 mol, and more preferably from 1 to 1.09 mol, per 1 mol of the charged sulfur source (alkali metal sulfide and/or alkali metal hydrosulfide) remained in the system after the dehydration step described below.

4. Molecular Weight Adjusting Agent, Branching/Crosslinking Agent

To form a terminal having a specific structure on the PAS to be produced or to adjust the polymerization reaction and/or the molecular weight, a monohalo compound (not necessarily an aromatic compound) may be used together. Furthermore, to produce branched or crosslinked polymer, a polyhalo compound (not necessarily an aromatic compound) in which three or more halogen atoms are bonded, active hydrogen-containing halogenated aromatic compound, halogenated aromatic nitro compound, or the like may be used together. Preferable examples of the polyhalo compound as the branching/crosslinking agent include trihalobenzene.

5. Organic Amide Solvent

In the present invention, as the solvent for dehydration reaction and polymerization reaction, an organic amide solvent which is an aprotic polar organic solvent is used. The organic amide solvent is preferably an organic amide solvent that is stable against alkali at high temperatures. Specific examples of the organic amide solvent include amide compounds, such as N,N-dimethylformamide and N,N-dimethylacetamide; N-alkylcaprolactam compounds, such as N-methyl-ε-caprolactam; N-alkylpyrrolidone compounds or N-cycloalkylpyrrolidone compounds, such as N-methyl-2-pyrrolidone (NMP) and N-cyclohexyl-2-pyrrolidone; N,N-dialkylimidazolidinone compounds, such as 1,3-dialkyl-2-imidazolidinone; tetraalkyl urea compounds, such as tetramethyl urea; hexaalkylphosphoric triamide compounds, such as hexamethylphosphoric triamide; and the like. The organic amide solvent may be used alone or in a combination of two or more types thereof.

Among these organic amide solvents, N-alkylpyrrolidone compounds, N-cycloalkylpyrrolidone compounds, N-alkylcaprolactam compounds, and N,N-dialkylimidazolidinone compounds are preferable, and in particular, N-methyl-2-pyrrolidone (NMP), N-methyl-ε-caprolactam, and 1,3-dialkyl-2-imidazolidinone are preferably used. The amount of the organic amide solvent to be used in the polymerization reaction of the present invention is typically in a range of 0.1 to 10 kg per 1 mol of the sulfur source (charged sulfur source).

6. Polymerization Aid

In the present invention, for the purposes of accelerating polymerization reaction and obtaining a highly polymerized PAS in a short period of time, various polymerization aids may be used as necessary. The amount of the polymerization aid to be used is typically in a range of 0.01 to 10 mol per 1 mol of the sulfur source (charged sulfur source) although the amount varies depending on the type of the compound to be used.

7. Phase Separation Agent

In the present invention, particularly in the polymerization step of PAS, a phase separation agent may be contained in the reaction mixture from the perspective of accelerating the polymerization reaction and obtaining a highly polymerized PAS in a short period of time. That is, as the method of producing PAS of the present invention, the method of producing PAS in the presence of a phase separation agent is preferable. The phase separation agent is used to perform liquid-liquid phase separation of the reaction mixture, in which the polymerization reaction has proceeded for a certain degree (liquid phase), into two phases, which are a concentrated polymer phase (dissolved PAS phase) and a dilute polymer phase (organic amide solvent phase). Typically, publicly known phase separation agents of PAS can be used as the phase separation agent, and examples thereof include at least one type selected from the group consisting of organic carboxylic acid metal salts, organic sulfonic acid metal salts, alkali metal halides, alkaline earth metal halides, alkaline earth metal salts of aromatic carboxylic acids, phosphoric acid alkali metal salts, alcohols, paraffin hydrocarbons, and water. The phase separation agent may be used alone or in a combination of two or more types thereof. Among the phase separation agents, water and organic carboxylic acid metal salts, such as lithium acetate and sodium acetate, are preferable, and water is more preferable because of low cost and ease in post-treatment. The amount of the phase separation agent to be used varies depending on the type of the compound to be used; however, the amount is typically in a range of 0.01 to 20 mol per 1 kg of the organic amide solvent.

The phase separation agent may be present in the reaction mixture from early stage of the polymerization reaction; however, the phase separation agent may also be added in the middle of the polymerization reaction. Furthermore, the phase separation agent may be added to the reaction mixture after the completion of the polymerization reaction to form a liquid-liquid phase separation state and then cooled. In the second-stage polymerization step, the polymerization reaction is preferably continued in a condition where a concentrated polymer phase and a dilute polymer phase are phase-separated in the reaction system.

Regarding water which is preferably used also as the phase separation agent, a method, in which water is added in a manner that the water content in the reaction system is greater than 4 mol but 20 mol or less per 1 kg of the organic amide solvent in the second-stage polymerization step, can be employed. When water is added in the second-stage polymerization step (the water may function as the phase separation agent), the water is preferably added in a manner that the water content in the reaction system is more preferably from 4.1 to 14 mol, and particularly preferably from 4.2 to 10 mol, per 1 kg of the organic amide solvent.

8. Dehydration Step

In the present invention, PAS is produced using the sulfur source and the dihalo aromatic compound in the organic amide solvent by the production method including the steps 1 to 3. In the preparation step described below, a mixture containing an organic amide solvent, a sulfur source, water, a dihalo aromatic compound, and an alkali metal hydroxide in an amount that is less than an equimolar amount relative to the sulfur source is prepared. Before the preparation step, a dehydration step of discharging at least a part of distillate containing water from a system, containing the mixture of an organic amide solvent, a sulfur source, and an alkali metal hydroxide, to outside the system by heating the mixture is preferably performed.

That is, the sulfur source often contains water content such as hydrated water (crystallization water). Furthermore, when the sulfur source and the alkali metal hydroxide are used in the form of aqueous mixture, water is contained as the medium. The polymerization reaction of the sulfur source and the dihalo aromatic compound is affected by the water content present in the polymerization reaction system. Therefore, typically, the water content in the polymerization reaction system is preferably adjusted by performing the dehydration step before the polymerization step.

In the dehydration step, at least a part of distillate containing water is discharged from the system, containing the mixture of an organic amide solvent, a sulfur source (preferably a sulfur source containing an alkali metal hydrosulfide), and at least a part of the total charged amount of the alkali metal hydroxide, to outside the system by heating the mixture preferably in an inert gas atmosphere. The dehydration step is performed in a reaction vessel and the discharging of the distillate to outside the system is typically performed by discharging the distillate to outside the reaction vessel. The water content that should be dehydrated during the dehydration step includes hydrated water contained in the raw materials charged in the dehydration step, aqueous medium of aqueous mixture, water produced by a side reaction between the raw materials, and the like.

Charging of the raw materials to the reaction vessel is typically performed in a range of approximately 20° C. to 300° C., and preferably approximately 20° C. to 200° C. The order of charging of the raw materials is not specified, and raw materials may be additionally charged in the middle of the dehydration operation. In the dehydration step, an organic amide solvent is used as a medium. The organic amide solvent used in the dehydration step is preferably the same organic amide solvent as that used in the polymerization step, and from the perspective of being readily available industrially at a low price, N-methyl-2-pyrrolidone (NMP) is more preferable. The amount of the organic amide solvent to be used is typically approximately from 0.1 to 10 kg per 1 mol of the sulfur source charged in the reaction vessel.

The dehydration operation is performed, after charging the raw materials to the reaction vessel, heating the mixture containing the components described above at a temperature range of typically 300° C. or lower, and preferably in a range of 100 to 250° C., typically for 15 minutes to 24 hours, and preferably 30 minutes to 10 hours. The heating method may be a method in which a fixed temperature is maintained, a method in which the temperature is increased stepwise or continuously, or a method in which these methods are combined. The dehydration step is performed by a batch method, continuous method, method combining these, and the like. The apparatus for performing the dehydration step may be the same as or different from the polymerization vessel (reactor) used in the polymerization step.

In the dehydration step, the water and the organic amide solvent are distilled as vapor by heating. Therefore, the distillate contains the water and the organic amide solvent. A part of the distillate may be refluxed in the system to suppress the discharging of the organic amide solvent to outside the system; however, at least a part of the distillate containing water is discharged outside the system to adjust the water content. When the distillate is discharged outside the system, a little amount of the organic amide solvent is discharged outside the system together with the water.

In the dehydration step, hydrogen sulfide originated from the sulfur source is volatilized. That is, in the dehydration step, when the mixture is heated, the sulfur source and the water are reacted by the heating to produce hydrogen sulfide and an alkali metal hydroxide, thereby volatilizing the gaseous hydrogen sulfide. For example, when 1 mol of alkali metal hydrosulfide and 1 mol of water are reacted, 1 mol of hydrogen sulfide and 1 mol of alkali metal hydroxide are produced. As at least a part of the distillate containing water is discharged outside the system, the volatilized hydrogen sulfide is also discharged outside the system.

Due to the hydrogen sulfide that is volatilized to the outside of the system by the dehydration step, the amount of the sulfur source in the mixture remained in the system after the dehydration step decreases relative to the amount of the charged sulfur source. When the sulfur source containing an alkali metal hydrosulfide as the main component is used, the amount of the sulfur source in the mixture remained in the system after the dehydration step is substantially equal to the value obtained by subtracting the molar quantity of the hydrogen sulfide volatilized to the outside the system from the molar quantity of the charged sulfur source. The sulfur source in the mixture remained in the system after the dehydration step can be called "effective sulfur source". This effective sulfur source corresponds to "charged sulfur source" in the preparation step and the following polymerization step. Therefore, in the present invention, "charged sulfur source" indicates the effective sulfur source present in the mixture after the dehydration step.

The effective sulfur source after the dehydration step is a mixture containing the alkali metal hydrosulfide, the alkali metal sulfide, and the like; and specific form thereof is not particularly limited. It has been conventionally known that, when an alkali metal hydrosulfide and an alkali metal hydroxide are heated in an organic amide solvent, the alkali metal hydrosulfide and the alkali metal hydroxide are reacted in situ to form an alkali metal sulfide. It is conceived that, when an alkali metal hydroxide is added in the dehydration step, an alkali metal sulfide is produced by the reaction between the alkali metal hydrosulfide and the alkali metal hydroxide.

As described above, since the amount of the sulfur source charged initially in the dehydration step decreases after the dehydration step due to volatilization of the hydrogen sulfide to the outside of the system, it is necessary to quantify the amount of the sulfur source in the mixture remained in the system after the dehydration step (effective sulfur source) based on the amount of the hydrogen sulfide volatilized to the outside of the system.

In the dehydration step, water contents such as hydrated water, water medium, and byproduct water, are dehydrated until the content is within the range of necessary amount. In the dehydration step, the dehydration is preferably performed until the content becomes preferably 0 to 2 mol, and more preferably from 0.5 to 2 mol, per 1 mol of the effective sulfur source. If the water content became too low in the dehydration step, the water content can be adjusted to the desired water content by adding water in the preparation step that is performed before the polymerization.

The alkali metal sulfide produces an alkali metal hydroxide via an equilibrium reaction with water. In the method of producing PAS using a sulfur source containing an alkali metal hydrosulfide as a main component, the molar ratio of the charged amount of the alkali metal hydroxide per 1 mol of the effective sulfur source is calculated taking the amount of the alkali metal sulfide, which is a component present in a little amount, into consideration. Furthermore, when the hydrogen sulfide volatilizes to the outside of the system during the dehydration step, a substantially equimolar amount, relative to the volatilized hydrogen sulfide, of alkali metal hydroxide is produced, and therefore, the molar ratio of the charged amount of the alkali metal hydroxide per 1 mol of the effective sulfur source is calculated taking the amount of the hydrogen sulfide volatilized to the outside of the system during the dehydration step into consideration.

Preferably, in the dehydration step, a mixture containing the organic amide solvent, the sulfur source containing the alkali metal hydrosulfide, and the alkali metal hydroxide in an amount of 0.70 to 1.05 mol, and particularly 0.75 to 1.0 mol, per 1 mol of the sulfur source is heated to discharge at least a part of the distillate containing water from the system containing the mixture to the outside of the system.

When the molar ratio of the alkali metal hydroxide per 1 mol of the sulfur source is too small, a large amount of the hydrogen sulfide is volatilized during the dehydration step, thereby causing reduction in productivity due to decrease in the charged sulfur source amount, causing abnormal reaction due to increase in persulfide component in the charged sulfur source remained after the dehydration, and readily causing deterioration in the quality of the produced PAS. When the molar ratio of the alkali metal hydroxide per 1 mol of the sulfur source is too large, deterioration in the organic amide solvent may increase.

The apparatus for performing the dehydration step may be the same as or different from the reaction vessel (reactor) used in the following polymerization step. Furthermore, the material of the apparatus is preferably a corrosion resistant material, such as titanium. In the dehydration step, typically, a part of the organic amide solvent is discharged outside the reaction vessel together with the water. At this time, the hydrogen sulfide is discharged outside the system as a gas.

9. Preparation Step

In the preparation step, a mixture containing an organic amide solvent, a sulfur source, water, a dihalo aromatic compound, and an alkali metal hydroxide in an amount that is less than an equimolar amount relative to the sulfur source, i.e. preparation mixture, is prepared. Since the dehydration step may be, and is preferably, performed before the preparation step as described above, adjustment of amount of each component and controlling of pH or the like in the preparation step, by which a preparation mixture is formed, is performed taking the amounts of components in the mixture obtained by the dehydration step into consideration. Furthermore, the amount of the "charged sulfur source" (effective sulfur source) can be calculated by subtracting the molar quantity of the hydrogen sulfide volatilized in the dehydration step from the molar quantity of the sulfur source charged in the dehydration step.

The adjustment of the quantity ratio (molar ratio) of the components of the preparation mixture, adjustment of pH, and the like can be typically performed by adding a component, beside the charged sulfur source, in the mixture obtained by the dehydration step. For example, when the amounts of the alkali metal hydroxide and water are too small in the mixture obtained by the dehydration step, these components are added in the preparation step. Furthermore, a dihalo aromatic compound is added during the preparation step.

When the hydrogen sulfide is volatilized in the dehydration step, an alkali metal hydroxide is produced by an equilibrium reaction and remains in the mixture after the dehydration step. Therefore, it is necessary to determine these amounts accurately and decide the molar ratio of the alkali metal hydroxide relative to the "charged sulfur source" in the preparation step. That is, the number of moles of the alkali metal hydroxide is calculated based on the number of moles of the alkali metal hydroxide added in the dehydration step, the number of moles of the alkali metal hydroxide produced together with the hydrogen sulfide produced in the dehydration step, and the number of moles of the alkali metal hydroxide added in the preparation step. Furthermore, when the sulfur source contains an alkali metal sulfide, the number of moles of the alkali metal hydroxide is calculated in a manner that the number of moles of the alkali metal sulfide is included.

The method of producing PAS of the present invention prepares a mixture containing an alkali metal hydroxide in an amount that is less than an equimolar amount relative to the sulfur source (charged sulfur source) in the preparation step. When the molar ratio of the alkali metal hydroxide per 1 mol of the sulfur source (charged sulfur source) is 1 mol or greater (including 1.000 mol), the effect of suppressing the byproduct formation during the polymerization reaction may be insufficient, the nitrogen content originated from impurities in the produced PAS may not be sufficiently reduced, and/or the yield of the PAS polymer may not be sufficiently enhanced. The molar ratio of the alkali metal hydroxide per 1 mol of the sulfur source (charged sulfur source) is in a range of preferably 0.7 to 0.99 mol, more preferably 0.75 to 0.98 mol, and particularly preferably 0.8 to 0.97 mol. It is conceived that the method of producing PAS of the present invention can suppress the reaction between SMAB, which is a byproduct, with the dihalo aromatic compound, such as pDCB, in the initial stage of the polymerization step in which the content, i.e. abundance, of the dihalo aromatic compound, such as pDCB, is large, by preparing the mixture containing the alkali metal hydroxide in an amount that is less than the equimolar amount relative to the sulfur source (charged sulfur source) in the preparation step. Because of this, the formation of CPMABA, which is another byproduct, is also suppressed. As a result, it is conceived that side reactions are suppressed, thereby making it possible to obtain PAS with a high purity and a high molecular weight at a high yield.

The pH of the preparation mixture is not particularly limited; however, the proportion of each of the components, such as an alkali metal hydroxide, is adjusted in a manner that the pH is typically higher than 12.5 and 14 or less, preferably from 12.6 to 14, and more preferably from 12.7 to 13.9. By setting the molar ratio of the alkali metal hydroxide per 1 mol of the sulfur source (charged sulfur source) to be within the range described above, the pH can be easily adjusted to higher than 12.5, thereby making it possible to stably perform the polymerization reaction while the formation of byproduct is suppressed, and making it possible to easily obtain high quality PAS. In the present invention, the polymerization reaction between the sulfur source and the dihalo aromatic compound is initiated by heating the preparation mixture in the first-stage polymerization step; however, when the pH of the preparation mixture is 12.5 or less at the beginning of the first-stage polymerization, it may be difficult to obtain high quality PAS even if an alkali metal hydroxide is added in the middle of the first-stage polymerization. Note that, when the pH of the preparation mixture is too high, deterioration in the organic amide solvent may be increased and abnormal reaction and/or decomposition reaction may occur during the polymerization as a result of too high abundance of the alkali metal hydroxide.

In the preparation step, a preparation mixture containing preferably from 0.1 to 5.5 mol, more preferably from 0.5 to 5.3 mol, even more preferably from 2.5 to 5.2 mol, and particularly preferably from 3 to 5.1 mol of water per 1 kg of the organic amide solvent is preferably prepared.

Furthermore, in the preparation step, a preparation mixture containing preferably from 0.95 to 1.2 mol, and more preferably from 1 to 1.09 mol, of the dihalo aromatic compound per 1 mol of the sulfur source (charged sulfur source) is preferably prepared.

In the preparation step, as the sulfur source, a preparation mixture containing a sulfur source containing greater than 50 mol % of the alkali metal hydrosulfide and less than 50 mol % of the alkali metal sulfide is preferably prepared. In practice, the sulfur source having such a composition is prepared by the dehydration step.

In the preparation step, the amount of the organic amide solvent is preferably in a range of typically 0.1 to 5 kg, and preferably 0.15 to 1 kg, per 1 mol of the sulfur source (charged sulfur source). As long as the amount of the organic amide solvent is within the range described above, the amount thereof may be varied in the middle of the polymerization step.

10. Polymerization Step

In the present invention, the polymerization reaction is performed by at least two polymerization steps, which are the first-stage polymerization step and the second-stage polymerization step. More specifically, the polymerization step of the present invention includes: a first-stage polymerization step of initiating a polymerization reaction by heating the mixture, and producing a prepolymer having a dihalo aromatic compound conversion rate of 50% or greater; and a second-stage polymerization step of adding from 0.11 to 0.3 mol of an alkali metal hydroxide per 1 mol of the sulfur source, and continuing the polymerization reaction.

The method of polymerization reaction may be a batch method, continuous method, or method combining these. In the batch polymerization, a method in which two or more reaction vessels are used may be employed to shorten the polymerization cycle time.

First-Stage Polymerization Step

In the first-stage polymerization step, preferably, a polymerization reaction is initiated by heating the mixture prepared in the preparation step, i.e. the preparation mixture, to a temperature of 170 to 270° C. to produce a prepolymer having a dihalo aromatic compound conversion rate of 50% or greater. The polymerization temperature in the first-stage polymerization step is preferably selected from the range of 180 to 265° C. from the perspective of suppressing side reactions and decomposition reactions.

As the heating method, a method in which a fixed temperature is fixed, a method in which the temperature is increased stepwise or continuously, or a method in which these methods are combined is employed. The polymerization temperature may be decreased in the middle of the polymerization reaction. The heating method is preferably a method in which the temperature is increased continuously from the perspective of accelerating and controlling the polymerization reaction. The polymerization reaction time is typically in a range of 10 minutes to 72 hours, and preferably 30 minutes to 48 hours.

The dihalo aromatic compound conversion ratio is preferably from 50 to 98%, more preferably from 60 to 97%, even more preferably from 70 to 96%, and particularly preferably from 80 to 95%. The dihalo aromatic compound conversion ratio can be calculated by determining the amount of the dihalo aromatic compound remained in the reaction mixture via gas chromatography and then performing a calculation based on the remained amount, the charged amount of the dihalo aromatic compound, and the charged amount of the sulfur source.

In the first-stage polymerization step, the preparation mixture having a pH of higher than 12.5 but 14 or lower is preferably used to initiate the polymerization reaction. As long as this condition is employed, the amount of at least one type of water, the alkali metal hydroxide, or the organic amide solvent may be varied in the middle of the polymerization reaction. For example, water or an alkali metal hydroxide may be added to the reaction system in the middle of the polymerization. However, in the first-stage polymerization step, typically, the preparation mixture prepared in the preparation step is preferably used to initiate the polymerization reaction and terminate the first-stage polymerization reaction.

In the first-stage polymerization step and the second-stage polymerization step, the polymerization reaction may be performed as homogeneous polymerization or phase-separated polymerization. In many cases, in the first-stage polymerization step, the polymerization reaction is performed in the reaction system in which components containing the produced polymer are uniformly dissolved. On the other hand, in the second-stage polymerization step, typically, the polymerization reaction is preferably continued in the condition where a concentrated polymer phase and a dilute polymer phase are phase-separated, by adding a phase separation agent. Typically, since the polymerization reaction is performed while stirring is performed, the phase-separated polymerization reaction is practically performed in a condition where the concentrated polymer phase is dispersed as droplets in the organic amide solvent (dilute polymer phase). The condition of the phase separation can be clearly observed as the second-stage polymerization reaction proceeds.

Second-Stage Polymerization Step

In the second-stage polymerization step, the polymerization reaction is continued by adding from 0.11 to 0.3 mol of an alkali metal hydroxide, per 1 mol of the sulfur source, in the prepolymer produced by the first-stage polymerization step.

Regarding the polymerization temperature in the second-stage polymerization step, the polymerization reaction is continued by heating to preferably 245 to 290° C., and more preferably 257 to 285° C. The polymerization temperature may be maintained at a fixed temperature or may be increased or decreased stepwise as necessary. From the perspective of controlling the polymerization reaction, the temperature is preferably maintained at a fixed temperature.

The polymerization reaction time is typically in a range of 10 minutes to 72 hours, and preferably 30 minutes to 48 hours.

In the second-stage polymerization step, the amount of the added alkali metal hydroxide is preferably from 0.12 to 0.25 mol, more preferably from 0.13 to 0.22 mol, and particularly preferably from 0.14 to 0.2 mol, per 1 mol of the sulfur source. In the second-stage polymerization step, the alkali metal hydroxide is preferably added in a regulated manner that the total amount of the alkali metal hydroxide becomes preferably from 1.01 to 1.1 mol, more preferably from 1.02 to 1.08 mol, and even more preferably from 1.03 to 1.06 mol, per 1 mol of the sulfur source. When the total amount of the alkali metal hydroxide per 1 mol of the sulfur source is too small, PAS having a desired degree of polymerization may not be obtained. The total amount of the alkali metal hydroxide is the total of the amount of the alkali metal hydroxide present in the preparation mixture, the amount of the alkali metal hydroxide added in the second-stage polymerization step, and the amount of the alkali metal hydroxide optionally added in the first-stage polymerization step.

The time at which the alkali metal hydroxide is added may be at the beginning of the second-stage polymerization step or in the middle of the second-stage polymerization step. Furthermore, the alkali metal hydroxide may be added in portions. When the alkali metal hydroxide is added in portions as an aqueous mixture, the phase-separated polymerization described below in the second-stage polymerization step can be accelerated. When the alkali metal hydroxide is not added in the second-stage polymerization step, formation of byproducts may not be suppressed, the amount of impurities may be increased, and it may become difficult to stably obtain PAS having a high melt viscosity.

In the second-stage polymerization step, the phase-separated polymerization, in which the polymerization reaction is continued in a condition where a concentrated polymer phase and a dilute polymer phase are phase-separated in a reaction system, is preferably performed. Specifically, by adding a phase separation agent, the polymerization reaction system (polymerization reaction mixture) is phase-separated into the concentrated polymer phase (phase mainly containing dissolved PAS) and the dilute polymer phase (phase mainly containing organic amide solvent). The phase separation agent may be added at the beginning of the second-stage polymerization step, or the phase separation agent may be added in the middle of the second-stage polymerization step so that the phase separation occurs in the middle of the second-stage polymerization step. Note that, although the phase separation agent may be present not only in the second-stage polymerization step as described above, the phase separation agent is preferably used in the second-stage polymerization step.

As the phase separation agent, phase separation agents described above can be used, and at least one type selected from the group consisting of organic carboxylic acid metal salts, organic sulfonic acid metal salts, alkali metal halides, alkaline earth metal halides, alkaline earth metal salts of aromatic carboxylic acids, phosphoric acid alkali metal salts, alcohols, paraffin hydrocarbons, and water can be used. Among these, water is preferable because of low cost and ease in post-treatment.

In the second-stage polymerization step, a method, in which water as the phase separation agent is added in a manner that the water content in the reaction system is greater than 4 mol but 20 mol or less per 1 kg of the organic amide solvent, is preferably employed. When water is added as the phase separation agent in the second-stage polymerization step, the water is preferably added in a manner that the water content in the reaction system is more preferably from 4.1 to 14 mol, and particularly preferably from 4.2 to 10 mol, per 1 kg of the organic amide solvent.

Polyarylene sulfide polymerization reaction solution after polymerization reaction According to the method of producing PAS of the present invention, formation of byproducts during the polymerization reaction can be suppressed. As a result, according to the present invention, a PAS polymerization reaction solution after the second-stage polymerization step, i.e. after the polymerization reaction, which is the PAS polymerization reaction solution obtained in a method of producing PAS in which a sulfur source and a dihalo aromatic compound are polymerized in an organic amide solvent, and having a content of chlorophenyl methyl amino butanoic acid (CPMABA) of 16.5 mmol or less per 1 mol of the sulfur source, and preferably having a content of phenol of 9 mmol or less per 1 mol of the sulfur source (hereinafter, also simply referred to as "PAS polymerization reaction solution"), is provided.

The content of CPMABA in the PAS polymerization reaction solution (hereinafter, also referred to as "produced amount of CPMABA") can be measured by the following method. A slurry content that is in the reactor and that contains the PAS polymer (particles) after the completion of the polymerization reaction is cooled to room temperature, and then, using a part thereof, only a liquid component is isolated via centrifugal separation. The liquid component is precisely weighed in a volumetric flask, mixed with an aqueous solution having 40 mass % of acetonitrile content, and then agitated to extract CPMABA. The solution in which the CPMABA is extracted is filtered using a membrane filter, and the content of the CPMABA is measured using this filtrate as a measurement sample. The measurement is performed using the synthesized CPMABA as a standard substance by high-performance liquid chromatography (HPLC) to quantify the CPMABA in the measurement sample. Thereafter, the number of moles of the CPMABA per 1 mol of the sulfur source is calculated and used as the produced amount of the CPMABA (unit: mmol/mol), which is a byproduct. The produced amount of the CPMABA in the PAS polymerization reaction solution can be adjusted to preferably 16.3 mmol/mol or less, and more preferably 16 mmol/mol or less, per 1 mol of the sulfur source. The lower limit of the produced amount of the CPMABA is 0 mmol/mol; however, the lower limit may be approximately 0.1 mmol/mol.

The content of phenol in the PAS polymerization reaction solution (hereinafter, also referred to as "produced amount of phenol") can be measured by the following method. A slurry content that is in the reactor and that contains the PAS polymer (particles) after the completion of the polymerization reaction is cooled to room temperature, and then, using a part thereof, only a liquid component is isolated via centrifugal separation. The liquid component is precisely weighed in a volumetric flask, mixed with acetone, and then agitated to extract phenol. The content of the phenol is measured using the solution in which the phenol is extracted as a measurement sample. The measurement is performed using phenol, manufactured by Wako Pure Chemical Industries, Ltd., as a standard substance by gas chromatography (GC) to quantify the phenol in the measurement sample. Thereafter, the number of moles of the phenol per 1 mol of the sulfur source is calculated and used as the produced amount of the phenol (unit: mmol/mol), which is a byproduct. The produced amount of the phenol in the PAS polymerization reaction solution can be adjusted to preferably 8.7 mmol/mol or less, and more preferably 8.5 mmol/mol or less, per 1 mol of the sulfur source. The lower limit of the produced amount of the phenol is 0 mmol/mol; however, the lower limit may be approximately 0.1 mmol/mol.

In the PAS polymerization reaction solution of the present invention, by setting the produced amount of the CPMABA and the produced amount of the phenol to be within the ranges described above, it can be confirmed that the formation of byproducts, such as the CPMABA and phenol, is suppressed during the polymerization reaction. Therefore, according to the method of producing PAS of the present invention, the PAS (particulate PAS) having an average particle diameter of 10 to 5,000 μm, a melt viscosity of 0.1 to 3,000 Pa·s measured at a temperature of 310° C. and a shear rate of 1,216 sec$^{-1}$, and a nitrogen content of 750 ppm or less described below, can be obtained at a high yield.

11. Post-Treatment Step

In the method of producing PAS of the present invention, the post-treatment after the polymerization reaction, specifically after the second-stage polymerization step, can be performed by a conventional method. After the completion of the polymerization reaction, cooling is not necessary; however, it is also possible to obtain a slurry containing the polymer (hereinafter, also referred to as "product slurry") by cooling the reaction mixture, for example. As described above, cooling may be performed after liquid-liquid phase separation state is formed by adding the phase separation agent to the reaction mixture after the completion of the polymerization reaction. The cooled product slurry is separated by filtration as is or after diluted with water or the like, then washed and filtered repeatedly, and dried, whereby PAS can be recovered.

According to the method of producing PAS of the present invention, since a particulate PAS polymer can be produced, a method in which the particulate polymer is separated from the reaction solution by a method of sieving using a screen is preferable from the perspective of easily separating the polymer from byproducts and oligomers. Note that, with the product slurry, the polymer may be sieved as is at a high temperature.

After the filtration (sieving) described above, the PAS is preferably washed with the organic amide solvent, which is the same as the polymerization solvent, or an organic solvent, such as ketones (e.g. acetone) and alcohols (e.g. methanol). The PAS may be washed with hot water at a high temperature. The produced PAS may be treated with acids or salts, such as ammonium chloride.

II. Polyarylene Sulfide

1. PAS

According to the method of producing PAS of the present invention, formation of byproduct is suppressed, and high quality PAS having less impurities can be obtained. As the PAS obtained by the production method of the present invention, PAS with excellent handling can be obtained at a high yield by setting the average particle diameter to typically 10 to 5,000 μm, preferably 30 to 4,000 μm, and even more preferably 50 to 3,000 μm, and a melt viscosity, measured at a temperature of 310° C. and a shear rate of 1,216 sec$^{-1}$, to typically 0.1 to 3,000 Pa·s, preferably 0.5 to 2,000 Pa·s, more preferably 1 to 1,000 Pa·s, and even more preferably 5 to 500 Pa·s. Note that the melt viscosity of PAS can be measured by using approximately 20 g of dried polymer and using a Capirograph at a predetermined temperature and shear rate condition.

The PAS obtained by the method of producing PAS of the present invention is high quality PAS having less impurities, and preferably PAS having a nitrogen content in the PAS polymer of 750 ppm or less can be obtained. The nitrogen content in the PAS polymer can be measured by precisely weighing approximately 1 mg of a polymer sample and performing elemental analysis using a trace nitrogen and sulfur analyzer. The nitrogen content in the PAS polymer is more preferably 720 ppm or less, and even more preferably 700 ppm or less. The lower limit of the nitrogen content in the PAS polymer is of course 0 ppm; however, in many cases, the lower limit may be approximately 10 ppm. According to the method of producing PAS of the present invention, high quality PAS having less impurities can be obtained at a high yield, which is greater than 90 mass %. As the yield of the PAS, a proportion of the PAS polymer mass actually recovered relative to a reference value, which is the polymer mass (theoretical amount) obtained by assuming that all the effective sulfur source present in the reactor after the dehydration step were converted to the PAS polymer, is calculated and used as the yield of the polymer (unit: mass %). According to the method of producing PAS of the present invention, the yield of the PAS of 91 mass % or greater and, furthermore, of 92 mass % or greater can be achieved. The upper limit of the yield of the PAS is of course 100 mass %; however, the upper limit is typically approximately 99.5 mass %.

The PAS obtained by the method of producing PAS of the present invention can be molded into various injection molded products or extrusion molded products, such as sheets, films, fibers, and pipes, as is or after undergoing oxidative-crosslinking, alone or by blending with various inorganic fillers, fibrous fillers, and various synthetic resins, as desired. The PAS obtained by the production method of the present invention exhibits excellent color tone. Furthermore, the PAS compound obtained by the production method of the present invention produces less amount of volatile components and is suitable for fields, such as electronic devices, where suppression of volatile components is expected. As the PAS, polyphenylene sulfide (PPS) is particularly preferable.

EXAMPLES

The present invention will be more specifically described hereinafter with reference to working examples and comparative examples. Note that the present invention is not limited to these working examples. The measurement methods for characteristics and physical properties are as follows.

(1) Yield of Polymer

As the yield of the PAS polymer (hereinafter, also simply referred to as "polymer"), a proportion of the polymer mass actually recovered relative to a reference value, which was the polymer mass (theoretical amount) obtained by assuming that all the effective sulfur source present in the reactor after the dehydration step were converted to the polymer, was calculated and used as the yield of the polymer (unit: mass %).

(2) Melt Viscosity

The melt viscosity was measured by using approximately 20 g of dried polymer and the Capirograph 1-C, manufactured by Toyo Seiki Seisaku-sho, Ltd. At this time, a flat die having a diameter of 1 mm and length of 10 mm was used as the capillary, and the temperature was set to 310° C. The polymer sample was introduced into the instrument, and after the sample was held for 5 minutes, the melt viscosity at a shear rate of 1,216 sec$^{-1}$ was measured (unit: Pa·s).

(3) pH of Preparation Mixture

The preparation mixture was diluted 10 times using purified water (manufactured by Kanto Chemical Co., Inc.) and then measured at room temperature using a pH meter.

(4) Amount of Sulfur Source

For the sodium hydrosulfide (NaSH) and sodium sulfide ($Na_2S$) in the sulfur source aqueous solution, the total amount of the sulfur content was determined by iodimetry, and the amount of NaSH was determined by neutralization titration. The value obtained by subtracting the amount of NaSH from the total amount of the sulfur content was used as the amount of $Na_2S$.

(5) Nitrogen Content

The nitrogen content in the polymer (unit: ppm) was determined by precisely weighing approximately 1 mg of a polymer sample and performing elemental analysis using a trace nitrogen and sulfur analyzer (model: ANTEK 7000, manufactured by Astech Corporation).

(6) Produced Amount of CPMABA (Byproduct)

A slurry content that was in the reactor and that contained the PAS polymer (particles) after the completion of the polymerization reaction was cooled to room temperature, and then, using a part thereof only a liquid component was isolated via centrifugal separation. The liquid component was precisely weighed in a volumetric flask, mixed with an aqueous solution having 40 mass % of acetonitrile content, and then agitated to extract CPMABA. The solution in which the CPMABA was extracted was filtered using a membrane filter, and the content of the CPMABA was measured using this filtrate as a measurement sample. The measurement was performed using the synthesized CPMABA as a standard substance by high-performance liquid chromatograph, manufactured by Hitachi High-Technologies Corporation, (column oven: L-5025; UV detector: L-4000) to quantify the CPMABA in the measurement sample. The number of moles of the CPMABA per 1 mol of the sulfur source (hereinafter, also referred to as "CPMABA/S" represented with a unit "mmol/mol") was calculated and used as the produced amount of the CPMABA (unit: mmol/mol), which was a byproduct.

(7) Produced Amount of Phenol (Byproduct)

A slurry content that was in the reactor and that contained the PAS polymer (particles) after the completion of the polymerization reaction was cooled to room temperature, and then, using a part thereof, only a liquid component was isolated via centrifugal separation. The liquid component was precisely weighed in a volumetric flask, mixed with acetone, and then agitated to extract phenol. The content of the phenol was measured using the solution in which the phenol was extracted as a measurement sample. The measurement was performed using phenol, manufactured by Wako Pure Chemical Industries, Ltd., as a standard substance by a gas chromatograph "GC-6000", manufactured by Hitachi High-Technologies Corporation, to quantify the phenol in the measurement sample. Thereafter, the number of moles of the phenol per 1 mol of the sulfur source (hereinafter, also referred to as "phenol/S" represented with a unit "mmol/mol") was calculated and used as the produced amount of the phenol (unit: mmol/mol), which was a byproduct.

Working Example 1

1. Dehydration Step:

As the sulfur source, 2,001.7 g of sodium hydrosulfide (NaSH) aqueous solution having the analytical value by iodimetry of 62.20 mass % was used. The analytical value of NaSH by neutralization titration of this sulfur source was 61.15 mass % (21.83 mol), and 0.37 mol of sodium sulfide ($Na_2S$) was contained therein. The sodium hydrosulfide aqueous solution described above and 1,006.5 g of 73.45 mass % sodium hydroxide (NaOH) aqueous solution were charged in a 20 L—autoclave (reactor) made of titanium together with 6,000 g of N-methyl-pyrrolidone (NMP). When the sulfur source formed from the sodium hydrosulfide and the sodium sulfide is denoted as "S", NaOH/S before the dehydration was 0.83 (mole/mole; hereinafter, also referred to as "mol/mol"). After the inside of the reactor was purged with nitrogen gas, the temperature was gradually raised to 200° C. over a period of approximately two hours while the contents in the reactor were being stirred, thereby 1,024.6 g of water and 1,215.1 g of NMP were distilled. At this time, 0.41 mol of hydrogen sulfide ($H_2S$) was volatilized. Therefore, the effective S amount (i.e. amount of "charged sulfur source") in the reactor after the dehydration step was 21.80 mol. The volatilized $H_2S$ content corresponded to 1.84 mol % relative to the sulfur source charged in the reactor 2. Preparation Step:

After the dehydration step, the reactor was cooled to a temperature of 170° C., 3,349 g of p-dichlorobenzene (hereinafter, also referred to as "pDCB"; pDCB/effective S=1.045 (mol/mol); note that the value of "mol/mol" was calculated to three decimal places; hereinafter the same), 3,391 g of NMP (NMP/effective S=375 (g/mol)), and 219.5 g of water were added. Furthermore, 14.64 g of NaOH with a purity of 97% was added in a manner that NaOH in reactor/effective S=0.900 (mol/mol) to obtain a preparation mixture (pH 13.61) (total water content in reactor/NMP=4.0 (mol/kg)).

3. Polymerization Step:

While the preparation mixture was stirred by rotating a stirrer installed in the reactor, the temperature was continuously raised from 183° C. to 260° C. over 2.5 hours to perform a polymerization reaction (first-stage polymerization step). The pDCB conversion ratio was 90.8%.

Thereafter, 444 g of water and 125.9 g of NaOH were charged under pressure (total water content in reactor/NMP=7.0 (mol/kg); total NaOH/effective S=1.040 (mol/mol)), and then the temperature was raised to 265° C. to a perform polymerization reaction for 2.5 hours as the phase-separated polymerization (second-stage polymerization step). After the completion of the polymerization reaction, the reaction mixture was cooled to room temperature, and using a part thereof as a sample, the produced amount of byproducts in the PAS polymerization reaction solution was measured.

4. Post-Treatment Step

After the reaction mixture was cooled to room temperature after the completion of the polymerization reaction as described above, the reaction mixture was passed through a 100-mesh screen (sieve opening: 150 µm) to sieve the polymer (particulate polymer). The separated polymer was washed three times with acetone, then washed three times with water, washed with 0.3% acetic acid aqueous solution, and washed four times with water to obtain a washed polymer. The washed polymer was dried at a temperature of 105° C. for 13 hours. The yield of the particulate polymer (passed through 100-mesh) obtained as described above was 92.2%. The characteristics of the polymer are shown in Table 1 together with the produced amount of byproducts and the like.

Working Example 2

1. Dehydration Step:

As the sulfur source, 2,341.6 g of NaSH aqueous solution having the analytical value by iodimetry of 62.20 mass % was used. The analytical value of NaSH by neutralization titration of this sulfur source was 61.15 mass % (25.54 mol), and 0.44 mol of $Na_2S$ was contained therein. The NaSH aqueous solution described above and 1,179.40 g of 73.45 mass % NaOH aqueous solution were introduced in a reactor together with 6,000 g of NMP. The NaOH/S before the dehydration was 0.83 (mol/mol). After the inside of the reactor was purged with nitrogen gas, the temperature was gradually raised to 200° C. over a period of approximately two hours while the contents in the reactor were being stirred, thereby 1,149.0 g of water and 1,378.8 g of NMP were distilled. At this time, 0.42 mol of $H_2S$ was volatilized. Therefore, the effective S amount in the reactor after the dehydration step was 25.56 mol. The volatilized $H_2S$ content corresponded to 1.60 mol % relative to the sulfur source charged in the reactor.

2. Preparation Step:

After the dehydration step, the reactor was cooled to a temperature of 170° C., and 3,927 g of pDCB (pDCB/effective S=1.045 (mol/mol)), 3,045 g of NMP (NMP/effective S=300 (g/mol)), and 67.9 g of water were added. Furthermore, 20.46 g of NaOH with a purity of 97% was added in a manner that NaOH in reactor/effective S=0.900 (mol/mol) to obtain a preparation mixture (pH 13.68) (total water content in reactor/NMP=4.0 (mol/kg)).

3. Polymerization Step:

The first-stage polymerization step was performed in the same manner as in Working Example 1. The pDCB conversion ratio was 89.4%. Thereafter, 415 g of water and 147.59 g of NaOH were introduced under pressure (total water content in reactor/NMP=7.0 (mol/kg); total NaOH/effective S=1.040 (mol/mol)), and then the temperature was raised to 265° C. to perform a reaction for 2.5 hours as the phase-separated polymerization (second-stage polymerization step). After the completion of the polymerization reaction, the reaction mixture was cooled to room temperature, and using a part thereof as a sample, the produced amount of byproducts in the PAS polymerization reaction solution was measured.

4. Post-Treatment Step

After the completion of the polymerization reaction, the washed polymer was obtained in the same manner as in Working Example 1. The washed polymer was dried at a temperature of 105° C. for 13 hours. The yield of the particulate polymer (passed through 100-mesh) obtained as described above was 93.5%. The characteristics of the polymer are shown in Table 1 together with the produced amount of byproducts and the like.

Working Example 3

1. Dehydration Step:

As the sulfur source, 2,341.4 g of NaSH aqueous solution having the analytical value by iodimetry of 62.20 mass % was used. The analytical value of NaSH by neutralization titration of this sulfur source was 61.15 mass % (25.97 mol), and 0.44 mol of $Na_2S$ was contained therein. The NaSH aqueous solution described above and 1,119.5 g of 73.45 mass % NaOH aqueous solution were introduced in a reactor together with 6,000 g of NMP. The NaOH/S before the dehydration was 0.79 (mol/mol). After the inside of the reactor was purged with nitrogen gas, the temperature was gradually raised to 200° C. over a period of approximately two hours while the contents in the reactor were being stirred, thereby 1,123.3 g of water and 1,419.6 g of NMP were distilled. At this time, 0.43 mol of $H_2S$ was volatilized. Therefore, the effective S amount in the reactor after the dehydration step was 25.55 mol. The volatilized $H_2S$ content corresponded to 1.66 mol % relative to the sulfur source introduced in the reactor.

2. Preparation Step:

After the dehydration step, the reactor was cooled to a temperature of 170° C., and 3,887 g of pDCB (pDCB/effective S=1.035 (mol/mol)), 3,083 g of NMP (NMP/effective S=300 (g/mol)), and 58.4 g of water were added. Furthermore, 11.91 g of NaOH with a purity of 97% was added in a manner that NaOH in reactor/effective S=0.850 (mol/mol) to obtain a preparation mixture (pH 13.65) (total water content in reactor/NMP=4.0 (mol/kg)).

3. Polymerization Step:

The first-stage polymerization step was performed in the same manner as in Working Example 1. The pDCB conversion ratio was 90.1%. Thereafter, 414 g of water and 194.90 g of NaOH were introduced under pressure (total water content in reactor/NMP=7.0 (mol/kg); total NaOH/effective S=1.035 (mol/mol)), and then the temperature was raised to 265° C. to perform a reaction for 2.5 hours as the phase-separated polymerization (second-stage polymerization step). After the completion of the polymerization reaction, the reaction mixture was cooled to room temperature, and using a part thereof as a sample, the produced amount of byproducts in the PAS polymerization reaction solution was measured.

4. Post-Treatment Step

After the completion of the polymerization reaction, the washed polymer was obtained in the same manner as in Working Example 1. The washed polymer was dried at a temperature of 105° C. for 13 hours. The yield of the particulate polymer (passed through 100-mesh) obtained as described above was 94.5%. The characteristics of the polymer are shown in Table 1 together with the produced amount of byproducts and the like.

Comparative Example 1

1. Dehydration Step:

As the sulfur source, 2,002.9 g of NaSH aqueous solution having the analytical value by iodimetry of 62.20 mass % was used. The analytical value of NaSH by neutralization titration of this sulfur source was 61.15 mass % (21.75 mol), and 0.45 mol of $Na_2S$ was contained therein. The NaSH aqueous solution described above and 1,208.40 g of 73.45 mass % NaOH aqueous solution were introduced in a reactor together with 6,000 g of NMP. The NaOH/S before the dehydration was 1.00 (mol/mol). After the inside of the reactor was substituted with nitrogen gas, the temperature was gradually raised to 200° C. over a period of approximately two hours while the contents in the reactor were being stirred, thereby 1,028.4 g of water and 1,058.8 g of NMP were distilled. At this time, 0.33 mol of $H_2S$ was volatilized. Therefore, the effective S amount (i.e. amount of "charged sulfur source") in the reactor after the dehydration step was 21.88 mol. The volatilized $H_2S$ content corresponded to 1.49 mol % relative to the sulfur source introduced in the reactor

2. Preparation Step:

After the dehydration step, the reactor was cooled to a temperature of 170° C., and 3,409.0 g of pDCB (pDCB/effective S=1.060 (mol/mol)), 3,264 g of NMP (NMP/ effective S=375 (g/mol)), and 168.7 g of water were added. Furthermore, 20.18 g of NaOH with a purity of 97% was added in a manner that NaOH in reactor/effective S=1.070 (mol/mol) to obtain a preparation mixture (pH 13.69) (total water content in reactor/NMP=4.0 (mol/kg)).

3. Polymerization Step:

The first-stage polymerization step was performed in the same manner as in Working Example 1. The pDCB conversion ratio was 88.1%. Thereafter, 445 g of water was introduced under pressure (total water content in reactor/NMP=7.0 (mol/kg); total NaOH/effective S=1.070 (mol/mol)), and then the temperature was raised to 265° C. to perform a reaction for 2.5 hours as the phase-separated polymerization (second-stage polymerization step). After the completion of the polymerization reaction, the reaction mixture was cooled to room temperature, and using a part thereof as a sample, the produced amount of byproducts in the PAS polymerization reaction solution was measured.

4. Post-Treatment Step

After the completion of the polymerization reaction, the washed polymer was obtained in the same manner as in Working Example 1. The washed polymer was dried at a temperature of 105° C. for 13 hours. The yield of the particulate polymer (passed through 100-mesh) obtained as described above was 88.2%. The characteristics of the polymer are shown in Table 1 together with the produced amount of byproducts and the like.

Comparative Example 2

1. Dehydration Step:

As the sulfur source, 1,999.1 g of NaSH aqueous solution having the analytical value by iodimetry of 62.20 mass % was used. The analytical value of NaSH by neutralization titration of this sulfur source was 61.15 mass % (21.71 mol), and 0.45 mol of $Na_2S$ was contained therein. The NaSH aqueous solution described above and 1,129.80 g of 73.45 mass % NaOH aqueous solution were introduced in a reactor together with 6,000 g of NMP. The NaOH/S before the dehydration was 0.93 (mol/mol). After the inside of the reactor was purged with nitrogen gas, the temperature was gradually raised to 200° C. over a period of approximately two hours while the contents in the reactor were being stirred, thereby 1,004.8 g of water and 1,074.5 g of NMP were distilled. At this time, 0.37 mol of $H_2S$ was volatilized. Therefore, the effective S amount in the reactor after the dehydration step was 21.80 mol. The volatilized $H_2S$ content corresponded to 1.66 mol % relative to the sulfur source charged in the reactor.

2. Preparation Step:

After the dehydration step, the reactor was cooled to a temperature of 170° C., and 3,369.5 g of pDCB (pDCB/effective S=1.060 (mol/mol)), 3,250 g of NMP (NMP/effective S=375 (g/mol)), and 167.5 g of water were added. Furthermore, 11.60 g of NaOH with a purity of 97% was added in a manner that NaOH in reactor/effective S=1.000 (mol/mol) to obtain a preparation mixture (pH 13.66) (total water content in reactor/NMP=4.0 (mol/kg)).

3. Polymerization Step:

The first-stage polymerization step was performed in the same manner as in Working Example 1. The pDCB conversion ratio was 89.2%. Thereafter, 444 g of water and 53.93 g of NaOH were introduced under pressure (total water content in reactor/NMP=7.0 (mol/kg); total NaOH/effective S=1.060 (mol/mol)), and then the temperature was raised to 265° C. to perform a reaction for 2.5 hours as the phase-separated polymerization (second-stage polymerization step). After the completion of the polymerization reaction, the reaction mixture was cooled to room temperature, and using a part thereof as a sample, the produced amount of byproducts in the PAS polymerization reaction solution was measured.

4. Post-Treatment Step

After the completion of the polymerization reaction, the washed polymer was obtained in the same manner as in Working Example 1. The washed polymer was dried at a temperature of 105° C. for 13 hours. The yield of the particulate polymer (passed through 100-mesh) obtained as described above was 90.4%. The characteristics of the polymer are shown in Table 1 together with the produced amount of byproducts and the like.

Comparative Example 3

1. Dehydration Step:

As the sulfur source, 2,340.2 g of NaSH aqueous solution having the analytical value by iodimetry of 62.20 mass % was used. The analytical value of NaSH by neutralization titration of this sulfur source was 61.15 mass % (25.53 mol), and 0.44 mol of $Na_2S$ was contained therein. The NaSH aqueous solution described above and 1,448.20 g of 73.45 mass % NaOH aqueous solution were introduced in a reactor together with 6,000 g of NMP. The NaOH/S before the dehydration was 1.02 (mol/mol). After the inside of the reactor was purged with nitrogen gas, the temperature was gradually raised to 210° C. over a period of approximately two hours while the contents in the reactor were being stirred, thereby 1,232.4 g of water and 1,309.3 g of NMP were distilled. At this time, 0.38 mol of $H_2S$ was volatilized. Therefore, the effective S amount in the reactor after the dehydration step was 25.59 mol. The volatilized $H_2S$ content corresponded to 1.45 mol % relative to the sulfur source charged in the reactor.

2. Preparation Step:

After the dehydration step, the reactor was cooled to a temperature of 170° C., and 3,987 g of pDCB (pDCB/effective S=1.060 (mol/mol)), 2,990 g of NMP (NMP/effective S=300 (g/mol)), and 79.8 g of water were added. Furthermore, 13.16 g of NaOH with a purity of 97% was added in a manner that NaOH in reactor/effective S=1.084 (mol/mol) to obtain a preparation mixture (pH 13.76) (total water content in reactor/NMP=4.0 (mol/kg)).

3. Polymerization Step:

The first-stage polymerization step was performed in the same manner as in Working Example 1. The pDCB conversion ratio was 86.6%. Thereafter, 415 g of water was introduced under pressure (total water content in reactor/NMP=7.0 (mol/kg); total NaOH/effective S=1.084 (mol/mol)), and then the temperature was raised to 265° C. to perform a reaction for 2.5 hours as the phase-separated polymerization (second-stage polymerization step). After the completion of the polymerization reaction, the reaction mixture was cooled to room temperature, and using a part thereof as a sample, the produced amount of byproducts in the PAS polymerization reaction solution was measured.

4. Post-Treatment Step

After the completion of the polymerization reaction, the washed polymer was obtained in the same manner as in Working Example 1. The washed polymer was dried at a temperature of 105° C. for 13 hours. The yield of the particulate polymer (passed through 100-mesh) obtained as described above was 88.3%. The characteristics of the polymer are shown in Table 1 together with the produced amount of byproducts and the like.

Comparative Example 4

1. Dehydration Step:

As the sulfur source, 2,340.5 g of sodium hydrosulfide (NaSH) aqueous solution having the analytical value by iodimetry of 62.20 mass % was used. The analytical value of NaSH by neutralization titration of this sulfur source was 61.15 mass % (25.53 mol), and 0.44 mol of $Na_2S$ was contained therein. The NaSH aqueous solution described above and 1,339.50 g of 73.45 mass % NaOH aqueous solution were introduced in a reactor together with 6,000 g of NMP. The NaOH/S before the dehydration was 0.95 (mol/mol). After the inside of the reactor was purged with nitrogen gas, the temperature was gradually raised to 200° C. over a period of approximately two hours while the contents in the reactor were being stirred, thereby 1,179.9 g of water and 1,220.0 g of NMP were distilled. At this time, 0.36 mol of $H_2S$ was volatilized. Therefore, the effective S amount in the reactor after the dehydration step was 25.60 mol. The volatilized $H_2S$ content corresponded to 1.40 mol % relative to the sulfur source introduced in the reactor.

2. Preparation Step:

After the dehydration step, the reactor was cooled to a temperature of 170° C., and 3,971 g of pDCB (pDCB/effective S=1.055 (mol/mol)), 2,907 g of NMP (NMP/effective S=300 (g/mol)), and 55.9 g of water were added. Furthermore, 8.51 g of NaOH with a purity of 97% was added in a manner that NaOH in reactor/effective S=1.000 (mol/mol) to obtain a preparation mixture (pH 13.72) (total water content in reactor/NMP=4.0 (mol/kg)).

3. Polymerization Step:

The first-stage polymerization step was performed in the same manner as in Working Example 1. The pDCB conversion ratio was 87.5%. Thereafter, 415 g of water and 73.91 g of NaOH were introduced under pressure (total water content in reactor/NMP=7.0 (mol/kg); total NaOH/effective S=1.070 (mol/mol)), and then the temperature was raised to 265° C. to perform a reaction for 2.5 hours as the phase-separated polymerization (second-stage polymerization step). After the completion of the polymerization reaction, the reaction mixture was cooled to room temperature, and using a part thereof as a sample, the produced amount of byproducts in the PAS polymerization reaction solution was measured.

4. Post-Treatment Step

After the completion of the polymerization reaction, the washed polymer was obtained in the same manner as in Working Example 1. The washed polymer was dried at a temperature of 105° C. for 13 hours. The yield of the particulate polymer (passed through 100-mesh) obtained as described above was 90.3%. The characteristics of the polymer are shown in Table 1 together with the produced amount of byproducts and the like.

TABLE 1

|  | Working Example 1 | Working Example 2 | Working Example 3 | Comparative Example 1 | Comparative Example 2 | Comparative Example 3 | Comparative Example 4 |
|---|---|---|---|---|---|---|---|
| First-stage polymerization step |  |  |  |  |  |  |  |
| NMP/S (g/mol) | 375 | 300 | 300 | 375 | 375 | 300 | 300 |
| $H_2O$/NMP (mol/kg) | 4.0 | 4.0 | 4.0 | 4.0 | 4.0 | 4.0 | 4.0 |
| NaOH/S (mol/mol) | 0.900 | 0.900 | 0.850 | 1.070 | 1.000 | 1.084 | 1.000 |
| pDCB (mol/mol) | 1.045 | 1.045 | 1.035 | 1.060 | 1.060 | 1.060 | 1.055 |
| Temperature/time (° C./hour) | 183/0 | 183/0 | 183/0 | 183/0 | 183/0 | 183/0 | 183/0 |
| (° C./hour) | Temperature increased/2.5 | Temperature increased/2.5 | Temperature increased/2.5 | Temperature increased/2.5 | Temperature increased/2.5 | Temperature increased/2.5 | Temperature increased/2.5 |
| (° C./hour) | 260/0 | 260/0 | 260/0 | 260/0 | 260/0 | 260/0 | 260/0 |
| Second-stage polymerization step |  |  |  |  |  |  |  |
| $H_2O$/NMP (mol/kg) | 7.0 | 7.0 | 7.0 | 7.0 | 7.0 | 7.0 | 7.0 |
| NaOH/S (mol/mol) | 1.040 | 1.040 | 1.035 | 1.070 | 1.060 | 1.084 | 1.070 |
| Temperature/time (° C./hour) | 265/2.5 | 265/2.5 | 265/2.5 | 265/2.5 | 265/2.5 | 265/2.5 | 265/2.5 |
| Produced amount of byproduct |  |  |  |  |  |  |  |
| CPMABA/S (mmol/mol) | 12.8 | 15.9 | 14.6 | 18.6 | 17.0 | 26.2 | 21.5 |
| Phenol/S (mmol/mol) | 8.2 | 6.9 | 6.8 | 10.4 | 8.2 | 11.7 | 11.3 |
| Polymer characteristics |  |  |  |  |  |  |  |
| Melt viscosity (Pa · s) | 33 | 23 | 21 | 28 | 21 | 21 | 21 |
| Nitrogen content (ppm) | 607 | 683 | 576 | 834 | 770 | 1048 | 941 |
| Yield of polymer (mass %) | 92.2 | 93.5 | 94.5 | 882 | 90.4 | 88.3 | 90.3 |

As shown in Table 1, by the method of producing PAS of Working Example 1 to Working Example 3 in which a sulfur source and a dihalo aromatic compound are polymerized in an organic amide solvent, the method comprising the following steps 1 to 3:

step 1: a preparation step of preparing a mixture containing an organic amide solvent, a sulfur source, water, a dihalo aromatic compound, and an alkali metal hydroxide in an amount that is less than an equimolar amount relative to the sulfur source;

step 2: a first-stage polymerization step of initiating a polymerization reaction by heating the mixture, and producing a prepolymer having a dihalo aromatic compound conversion rate of 50% or greater; and step 3: a second-stage polymerization step of adding from 0.11 to 0.3 mol of an alkali metal hydroxide per 1 mol of the sulfur source, and continuing the polymerization reaction, it was found that i) a PAS polymerization reaction solution in which the produced amount of CPMABA which is a byproduct is 16.5 mmol or less per 1 mol of the sulfur source and, similarly, the produced amount of phenol is 9 mmol or less per 1 mol of the sulfur source is obtained, ii) a particulate PAS polymer (passed through 100-mesh) having a nitrogen content of 750 ppm or less and a melt viscosity of 20 Pa·s or greater is obtained, and iii) the yield of the polymer exceeded 90 mass %. Therefore, according to the method of producing PAS of the present invention practically performed in Working Examples 1 to 3, it was found that side reactions were suppressed and PAS with a high purity and a high molecular weight was obtained at a high yield.

On the other hand, according to the method of producing PAS, in which a sulfur source and a dihalo aromatic compound are polymerized in an organic amide solvent, of Comparative Examples 1 to 4, in which a mixture containing an alkali metal hydroxide in an amount that is less than an equimolar amount relative to the sulfur source was not prepared in the preparation step and from 0.11 to 0.3 mol of an alkali metal hydroxide per 1 mol of the sulfur source was not added in the second-stage polymerization step, it was found that i) side reactions were not sufficiently suppressed since a PAS polymerization reaction solution in which the produced amount of CPMABA which is a byproduct was greater than 16.5 mmol per 1 mol of the sulfur source and, similarly, the produced amount of phenol was greater than 9 mmol per 1 mol of the sulfur source was obtained (Comparative Examples 1, 3, and 4), ii) PAS having a high purity and a high molecular weight was not obtained since the nitrogen content of the PAS polymer was greater than 750 ppm or the melt viscosity was less than 22 Pa·s, and iii) the yield of the polymer was less than 91 mass % and, in some cases, the yield was less than 90% by mass. That is, according to the method of producing PAS of Comparative Examples 1 to 4, it was found that side reactions were not suppressed and PAS with a high purity and a high molecular weight was not obtained at a high yield.

INDUSTRIAL APPLICABILITY

The present invention can provide a method of producing PAS that produces PAS having a high purity and a high molecular weight at a high yield while side reactions are suppressed, the method of producing PAS, in which a sulfur source and a dihalo aromatic compound are polymerized in an organic amide solvent, comprising the following steps 1 to 3:

step 1: a preparation step of preparing a mixture containing an organic amide solvent, a sulfur source, water, a dihalo aromatic compound, and an alkali metal hydroxide in an amount that is less than an equimolar amount relative to the sulfur source;

step 2: a first-stage polymerization step of initiating a polymerization reaction by heating the mixture, and producing a prepolymer having a dihalo aromatic compound conversion rate of 50% or greater; and step 3: a second-stage polymerization step of adding from 0.11 to 0.3 mol of an alkali metal hydroxide per 1 mol of the sulfur source, and continuing the polymerization reaction.

Therefore, the present invention has high industrial applicability.

The invention claimed is:

1. A method of producing polyarylene sulfide in which a sulfur source and a dihalo aromatic compound are polymerized in an organic amide solvent, the method comprising steps 1 to 4 below:
    step 1: a dehydration step of discharging at least a part of distillate containing water from a system containing a mixture of an organic amide solvent, a sulfur source, and an alkali metal hydroxide, to outside the system by heating the mixture;
    step 2: after the dehydration step, a preparation step of preparing a second mixture containing an organic amide solvent, a sulfur source, water, a dihalo aromatic compound, and an alkali metal hydroxide in an amount that is 0.900 mol or less per 1 mol of the sulfur source of the second mixture;
    step 3: a first-stage polymerization step of initiating a polymerization reaction by heating the second mixture, and producing a prepolymer having a dihalo aromatic compound conversion rate of 50% or greater; and
    step 4: a second-stage polymerization step of adding from 0.11 to 0.3 mol of an alkali metal hydroxide per 1 mol of the sulfur source of the second-stage polymerization, and continuing the polymerization reaction.

2. The method of producing polyarylene sulfide according to claim 1, wherein the sulfur source contains one or both of an alkali metal sulfide and an alkali metal hydrosulfide.

3. The method of producing polyarylene sulfide according to claim 1, wherein, in the preparation step, the second mixture containing from 0.75 to 0.900 mol of the alkali metal hydroxide per 1 mol of the sulfur source is prepared.

4. The method of producing polyarylene sulfide according to claim 1, wherein, in the preparation step, the second mixture has a pH of higher than 12.5 but 14 or lower.

5. The method of producing polyarylene sulfide according to claim 1, wherein, in the preparation step, the second mixture contains from 0.1 to 5.5 mol of the water per 1 kg of the organic amide solvent.

6. The method of producing polyarylene sulfide according to claim 1, wherein, in the preparation step, the second mixture contains from 0.95 to 1.2 mol of the dihalo aromatic compound per 1 mol of the sulfur source.

7. The method of producing polyarylene sulfide according to claim 1, wherein, in the first-stage polymerization step, the second mixture prepared in the preparation step is heated to a temperature of 170 to 270° C.

8. The method of producing polyarylene sulfide according to claim 1, wherein, in the first-stage polymerization step, the prepolymer having the dihalo aromatic compound conversion rate of 50 to 98% is produced.

9. The method of producing polyarylene sulfide according to claim 1, wherein, in the second-stage polymerization step, the polymerization reaction is continued by heating to a temperature of 245 to 290° C.

10. The method of producing polyarylene sulfide according to claim 1, wherein, in the second-stage polymerization step, the alkali metal hydroxide is added in a manner that a total amount of the alkali metal hydroxide is from 1.01 to 1.1 mol per 1 mol of the sulfur source.

11. The method of producing polyarylene sulfide according to claim 1, wherein, in the second-stage polymerization step, the polymerization reaction is continued in a condition where a concentrated polymer phase and a dilute polymer phase are phase-separated in a reaction system.

12. The method of producing polyarylene sulfide according to claim 1, wherein, in the second-stage polymerization step, water as a phase separation agent is added in a manner that a water content in the reaction system is greater than 4 mol but 20 mol or less per 1 kg of the organic amide solvent.

13. The method of producing polyarylene sulfide according to claim 1, wherein the method is performed in the presence of a phase separation agent.

14. The method of producing polyarylene sulfide according to claim 13, wherein the phase separation agent is at least one type selected from the group consisting of organic carboxylic acid metal salts, organic sulfonic acid metal salts, alkali metal halides, alkaline earth metal halides, alkaline earth metal salts of aromatic carboxylic acids, phosphoric acid alkali metal salts, alcohols, paraffin hydrocarbons, and water.

\* \* \* \* \*